United States Patent
Hagersten et al.

(10) Patent No.: US 10,915,466 B2
(45) Date of Patent: Feb. 9, 2021

(54) SYSTEM PROTECTING CACHES FROM SIDE-CHANNEL ATTACKS

(71) Applicant: Samsung Electronics Co., Ltd., Suwon-si (KR)

(72) Inventors: Erik Ernst Hagersten, Uppsala (SE); David Black-Schaffer, Uppsala (SE); Stefanos Kaxiras, Uppsala (SE)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 59 days.

(21) Appl. No.: 16/286,821

(22) Filed: Feb. 27, 2019

(65) Prior Publication Data

US 2019/0272239 A1 Sep. 5, 2019

Related U.S. Application Data

(60) Provisional application No. 62/638,450, filed on Mar. 5, 2018.

(51) Int. Cl.
*G06F 12/00* (2006.01)
*G06F 12/14* (2006.01)
(Continued)

(52) U.S. Cl.
CPC ...... *G06F 12/1483* (2013.01); *G06F 12/0811* (2013.01); *G06F 12/0891* (2013.01);
(Continued)

(58) Field of Classification Search
None
See application file for complete search history.

(56) References Cited

U.S. PATENT DOCUMENTS

| 6,519,684 B1 | 2/2003 | Moyer |
| 2007/0250666 A1 | 10/2007 | Sartorius et al. |

(Continued)

OTHER PUBLICATIONS

Caroline Trippel at. al., MeltdownPrime and SpectrePrime: Automatically-Synthesized Attacks Exploiting Invalidation-Based Coherence Protocols; arXiv:1802.03802v1 (cs.CR), Feb. 11, 2018.

(Continued)

*Primary Examiner* — Jason W Blust
(74) *Attorney, Agent, or Firm* — Harness, Dickey & Pierce, P.L.C.

(57) ABSTRACT

Caches may be vulnerable to side-channel attacks, such as Spectre and Meltdown, that involve speculative execution of instructions, revealing information about a cache that the attacker is not permitted to access. Access permission may be stored in the cache, such as in an entry of a cache table or in the region information for a cache table. Optionally, the access permission may be re-checked if the access permission changes while a memory instruction is pending. Optionally, a random index value may be stored in a cache and used, at least in part, to identify a memory location of a cacheline. Optionally, cachelines that are involved in speculative loads for memory instructions may be marked as speculative. On condition of resolving the speculative load as non-speculative, the cacheline may be marked as non-speculative; and on condition of resolving the speculative load as mis-speculated, the cacheline may be removed from the cache.

20 Claims, 7 Drawing Sheets

(51) Int. Cl.
*G06F 12/0811* (2016.01)
*G06F 12/0891* (2016.01)
*G06F 12/1027* (2016.01)

(52) U.S. Cl.
CPC ...... *G06F 12/1475* (2013.01); *G06F 12/1027* (2013.01); *G06F 2212/1052* (2013.01); *G06F 2212/683* (2013.01)

(56) References Cited

U.S. PATENT DOCUMENTS

| | | | |
|---|---|---|---|
| 2011/0167222 A1* | 7/2011 | Lee | G06F 9/3004 711/118 |
| 2011/0209151 A1 | 8/2011 | Chung et al. | |
| 2017/0286421 A1 | 10/2017 | Hayenga et al. | |

OTHER PUBLICATIONS

Matt Klein, "Meltdown and Spectre, explained", https ://web.archive. org/web/20180123060003/https ://medium.com/@mattklein|23/melt-down-spectre-explained-6bc8634cc0c2, Jan. 14, 2019, pp. 1-20.
Extended Search Report for corresponding European Application No. 19160463.6 dated Jul. 19, 2019.

* cited by examiner

SYSTEM PROTECTING CACHES FROM SIDE-CHANNEL ATTACKS

CROSS-REFERENCE TO RELATED APPLICATIONS

This application claims the benefit of U.S. Provisional Application No. 62/638,450, filed on Mar. 5, 2018. The entire disclosure of the above application is incorporated herein by reference.

TECHNICAL FIELD

The present disclosure relates to methods and systems for accessing data in computer memory devices, including mechanisms and techniques for improving the security of caches.

BACKGROUND

This section provides background information related to the present disclosure which is not necessarily prior art.

Processors may be equipped with caches that may store copies of the data and instructions stored in some high-capacity memory, such as dynamic random access memory (DRAM). Herein, the term "memory" may be used to collectively refer to all existing and future memory implementations. Cache memories, or "caches" for short, may be built from smaller and much faster memory than other memory implementations and may subsequently only hold copies of a portion of the data stored in main memories or secondary storage devices at any given time. Smaller caches may be implemented using SRAM and large caches may be implemented using DRAM.

A memory system of a computer system may include a range of caches, and some computer systems may include larger and slower caches (here referred to as higher-level caches) that are physically and/or logically closer to the main memory and smaller and faster caches (here referred to as lower-level caches) that are physically and/or logically closer to the processor. This configuration may be referred to as a cache hierarchy, memory hierarchy, or memory system. Each level in the cache hierarchy is referred to as a cache level.

SUMMARY

This section provides a general summary of the disclosure, and is not a comprehensive disclosure of its full scope or all of its features.

In an example embodiment, a method is provided for accessing data in a cache of a device, where the method includes storing in a buffer an access permission for a cacheline stored in the cache; for a memory instruction that involves the cacheline, determining whether the memory instruction is permitted to access the cacheline based at least in part on the access permission for the cacheline; and on condition of determining that the memory instruction is not permitted to access the cacheline, refraining from changing the cache.

In an example embodiment, a system is provided that includes a cache; and at least one processor configured to store in a buffer an access permission for a cacheline; for a memory instruction that involves the cacheline, determine whether the memory instruction is permitted to access the cacheline based at least in part on the access permission for the cacheline; and on condition of determining that the memory instruction is not permitted to access the cacheline, refrain from changing the cache.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The accompanying drawings, which are incorporated in and constitute a part of the specification, illustrate one or more example embodiments and, together with the description, explain at least some portions of these example embodiments. The accompanying drawings are not intended to limit the scope of the present disclosure. In the drawings.

DETAILED DESCRIPTION

The following description of the example embodiments refers to the accompanying drawings. The same reference numbers in different drawings identify the same or similar elements. The following detailed description does not limit the invention. Instead, the scope of the invention is defined by the appended claims. Some of the following example embodiments are discussed, for simplicity, with regard to the terminology and structure of cache hierarchies and methods for performing lookups in such hierarchies. However, the example embodiments to are not limited to these configurations, but may be extended to other arrangements as discussed later.

Reference throughout the specification to "example embodiment" or "example embodiments" are intended to mean that a feature, structure, or characteristic may be included in at least one example embodiment of the subject matter disclosed. Thus, the appearance of the phrases "in an example embodiment" or "in example embodiments" in various places throughout the specification is not necessarily referring to the same embodiment or embodiments. Further, features, structures or characteristics may be combined in any suitable manner in one or more example embodiments.

Example embodiments will now be described more fully with reference to the accompanying drawings.

Figure 1:
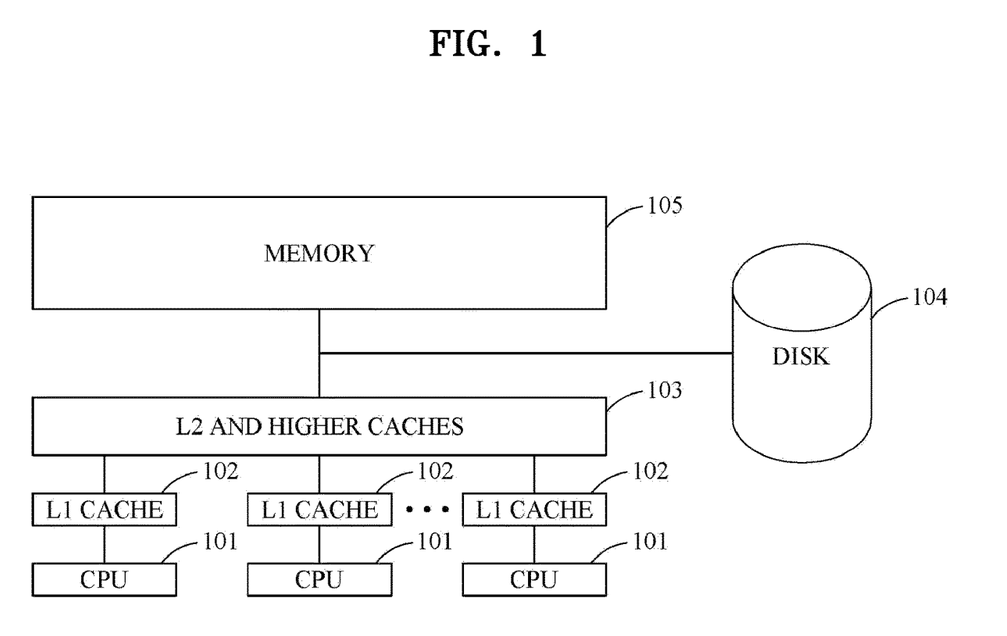
FIG. 1 is a block diagram illustrating an example embodiment of a multi-processor system.

FIG. 1 depicts an example computer system, where each CPU 101 is assigned its own first-level private cache 102

(L1 cache), wherein a private cache is a cache in which space for a data unit may only be accessed by an activity of a CPU that is local to the cache and/or a CPU in the same node as the cache, where the cache is private to that node. In this example computer system, the second-level cache 103 is shared by all the CPUs 101 and may contain data and instructions that are accessed by all of the CPUs 101. Cache 103 is a shared cache, since space for a data unit is available to activities of any CPU 101. Cache 103 is also a shared cache, since each data unit may exist only in one shared copy, whereas each private cache may have a replicated copy. Main memory 105 also stores instructions and data that are accessible by all CPUs 101. The main memory 105 is accessed using a physical address, or PA for short, while the addresses generated by a CPU 101 are identified as virtual addresses, or VA for short. Computer systems with several CPUs and several private caches, such as the example computer system shown in FIG. 1, may feature mechanisms for finding a requested data unit in one of the caches rapidly and/or as well as for keeping the multiple copies of a datum stored in different nodes coherent.

In the example computer system of FIG. 1, if a CPU 101 accesses data stored on the disk 104, a virtual memory system (not shown in FIG. 1) moves a chunk of data, identified as a page, from the disk 104 to the memory 105 and creates a translation from virtual addresses corresponding to the page to physical addresses. A special kind of translation cache (not shown in FIG. 1), identified as a "translation look-aside buffer" or TLB for short, caches the translation mappings from virtual pages to physical pages. The virtual memory system may be viewed as a caching system, which stores a portion of the data located in the disk 104 in the memory 105.

Figure 2:
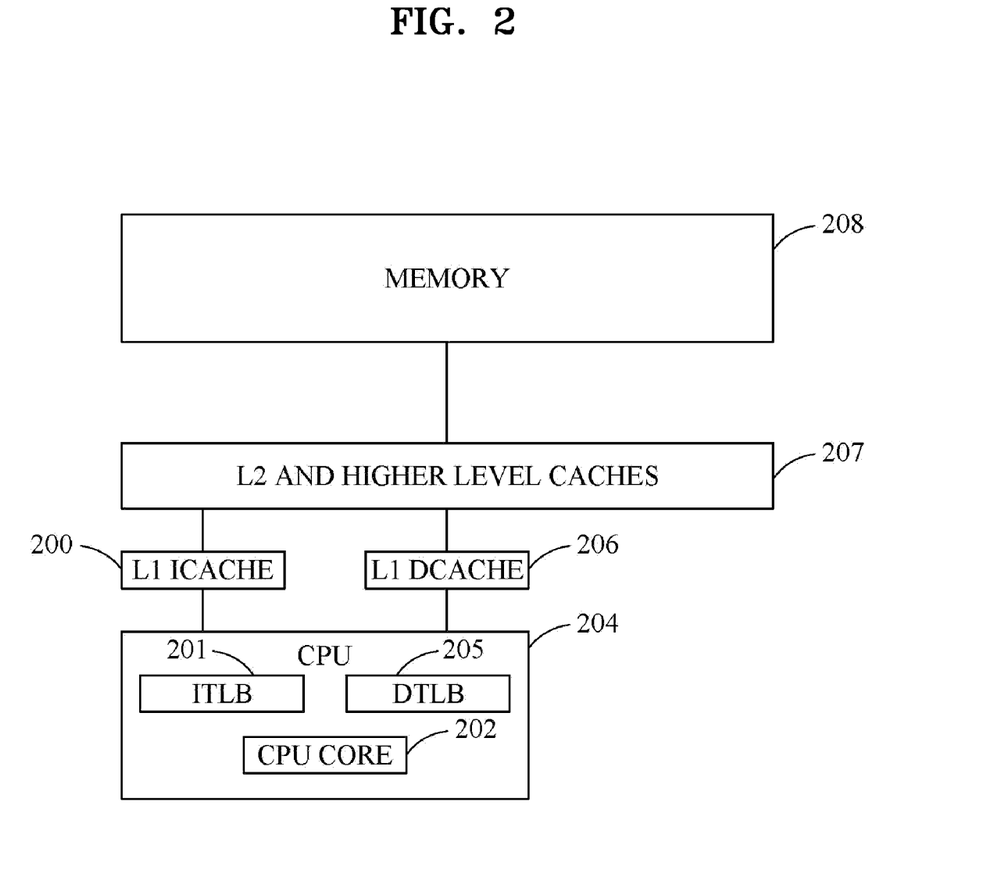
FIG. 2 is a block diagram of an example embodiment of a uni-processor system comprising a cache hierarchy.

FIG. 2 shows a more detailed view of the cache organization from FIG. 1, where the CPU 204 is shown to contain several cache-like structures, such as the Instruction TLB (ITLB, 201) and Data TLB (DTLDB, 205), and a CPU core 202. The level 1 cache 102 is shown as including an instruction cache 200 and a data cache 206, interposed between the CPU 204 and the level 2 (and potentially higher level) caches 207. FIG. 2 also shows a high-capacity memory 208 connected to the cache hierarchy.

When a CPU 204 requests data that is present in the cache, referred to as a cache hit, that request may be serviced much faster than an access to data that is not present in the cache, referred to as a cache miss. An application running on the CPU 204 that experiences fewer cache misses may execute more quickly and/or consume less energy than an application that exhibits more cache misses, assuming that the two applications otherwise have similar properties. Therefore, it may be advantageous to provide computer systems that reduce cache misses and/or that make cache hits and cache misses efficient with respect to their access latency and/or the energy that such memory transactions consume.

Data may be stored in caches in fixed chunks that are larger than the word size of a processor, known as cachelines. Example embodiments may feature cacheline sizes such as 32, 64 and 128 bytes, as well as larger and/or smaller cacheline sizes, and/or variable cacheline sizes.

In example embodiments, the data placement in memory 208 may be organized in a manner that each data word is statically mapped to reside in one specific cacheline. Each cache may have a random index value that identifies a portion of the cache where each cacheline may reside, known as a set. The set may contain space to hold one or more cachelines at the same time. The number of cachelines which the set may hold is referred to as its associativity. In set-associative caches, the associativity for all of the sets is the same. Associativity may also vary between the sets. Each of the spaces in a set that may hold a cacheline is referred to as a way.

Figure 3:
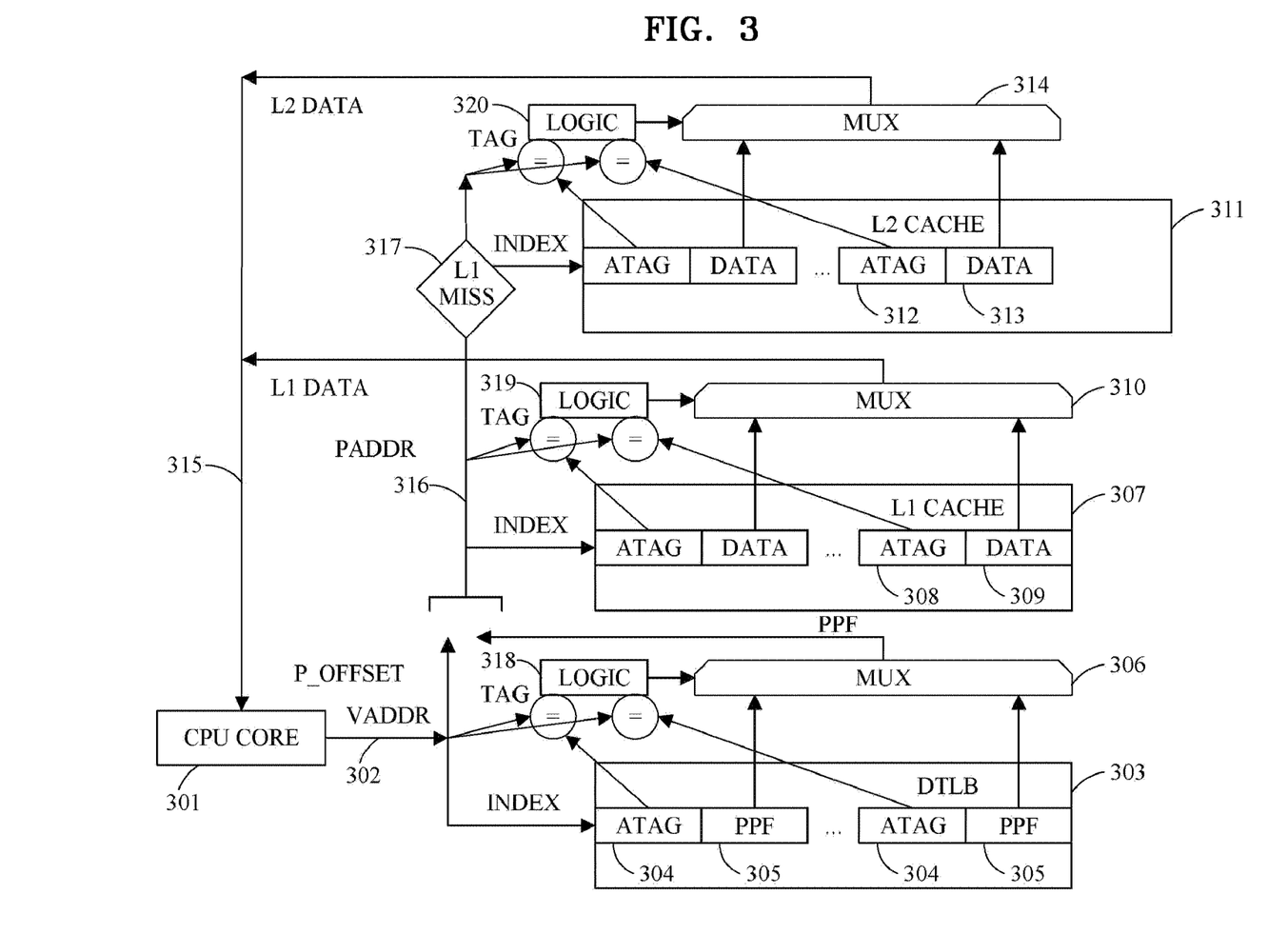
FIG. 3 illustrates an example embodiment of a two-level cache hierarchy comprising a set-associative caches and a set-associative data translation look-aside buffer.

In order to determine the identity of each cacheline stored in each set, cachelines in a cache each have some identifier associated with them, such as an address tag (ATAG). When looking for a specific cacheline in a cache, the address of the cacheline may be used to determine the set of the cache the cacheline may reside. The address tags of the cachelines of the corresponding set are compared to a tag portion of the address used to identify a cacheline (see, e.g., address tag (ATAG), which is depicted in FIG. 3 and described below) to determine if the desired cacheline resides in the cache, and if so, in which way it resides (e.g., in which of the spaces in a set that may hold a cacheline it resides). In example embodiments, the size of such ADDR address tags may be fairly large and may be in the range 30-40 bits, which may be 6-10% the size of a cacheline.

In example embodiments, a cache may have built-in strategies to determine which cacheline to keep in the set and which cacheline to evict (also referred to as replace) to make space for a new cacheline being brought into the set, referred to as its replacement policy. The replaced cacheline is known as a victim or a replaced cacheline. Replacement policies that may be used in conjunction with cache memories include, but are not limited to, least-recently used (LRU), pseudo-LRU and random replacement policies.

In inclusive cache hierarchies, a copy of a block of data (for example a cacheline) present in one cache level, for example a block of data in the L1 cache, may also exist in the higher cache levels (here, higher refers to cache levels with higher numbers than 1), for example in the L2 and L3 cache. Exclusive cache hierarchies only have one copy of the block of data (for example a cacheline) existing in the entire cache hierarchy, while non-inclusive hierarchies may have a mixture of both strategies. In example embodiments of exclusive and non-inclusive cache hierarchies, a cacheline may be stored in the next higher cache level upon eviction from a given cache level.

Some techniques for identifying specific cache locations within an example cache hierarchy, such as shown in FIGS. 1 and 2, are now described. FIG. 3 shows an example of the organization of a computer system node containing a CPU 301, a data translation lookaside buffer (DTLB) 303, an L1 cache 307, and an L2 cache 311 featuring with cache entries that include an ATAG 312 and DATA 313. The CPU 301 generates a memory request containing a virtual address 302 (VADDR), which is used to perform an associative lookup in the DTLB 303. The virtual address 302 is in this example divided into three parts: P-OFFSET (page offset, for example comprising the low-level bits), TAG, and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry comprises an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls a multiplexer (MUX) 306 to select the corresponding PPF 305. A physical address (PADDR) 316 is composed by concatenating the PPF 305 selected by MUX 306 with the P-OFFSET portion of the virtual address 302. Alternatively, if neither of the entries of the identified set match the TAG portion of the virtual address 302, then a TLB fill operation is performed and the corresponding translation entry is brought into the DTLB 303.

The PADDR 316 is used to perform a lookup in the L1 cache 307. More specifically, an INDEX portion of the PADDR 316 is used to identify the set where the cacheline containing the requested data may be stored. The L1 index may contain different bits than the DTLB index. The depicted L1 cache 307 has a 2-way associative organization with two entries in the identified set. Each entry comprises an address tag (ATAG) 308, and data 309 of the corresponding cacheline. A TAG portion of the PADDR 316 is compared with the ATAGs of each entry of the identified set. The logic 319 determines if there is match for any of the entries, and controls the MUX 310 to select the corresponding data and return 315 the data to the CPU core 301. If neither of the entries matches (depicted by L1 MISS 317) a lookup in the L2 cache 311 is performed by a logic 320 provided to a third multiplexer (MUX) 314, which returns 315 the data to the CPU core 301.

While the division of PADDR 316 into INDEX and TAG portions for the L2 cache lookup may differ from the division done for the L1 cache lookup, the remaining steps for the L2 cache lookup may be similar to those performed for the lookup in the L1 cache. If a miss in the L2 cache is determined, new lookups in higher-level caches or accesses to memory may be performed. If the INDEX portion of PADDR 316 used by the L1 cache is entirely composed by P_OFFSET bits, the access to the L1 cache 307 may be started before the PPF information coming from the MUX 306 is available. This may be referred to as a virtually indexed, physically tagged cache (VIPT). An L2 (and higher-level) cache may contain a larger number of sets than the L1 cache, and the TLB may translate some of the address bits for use as index bits.

In example embodiments, several "nodes", each with a memory hierarchy similar to the one depicted in FIG. 3, may be connected together to form a coherent multiprocessor system. In the example embodiment of a multiprocessor system shown in FIG. 1, each CPU has its own private L1 cache. Multiprocessor configurations may complicate the task of locating where a requested data resides since it may not be sufficient to search for the data in a next higher cache level. Mechanisms for searching caches of the other nodes as well as for keeping the multiple copies of a datum stored in different nodes coherent are employed to perform those tasks.

Figure 4:
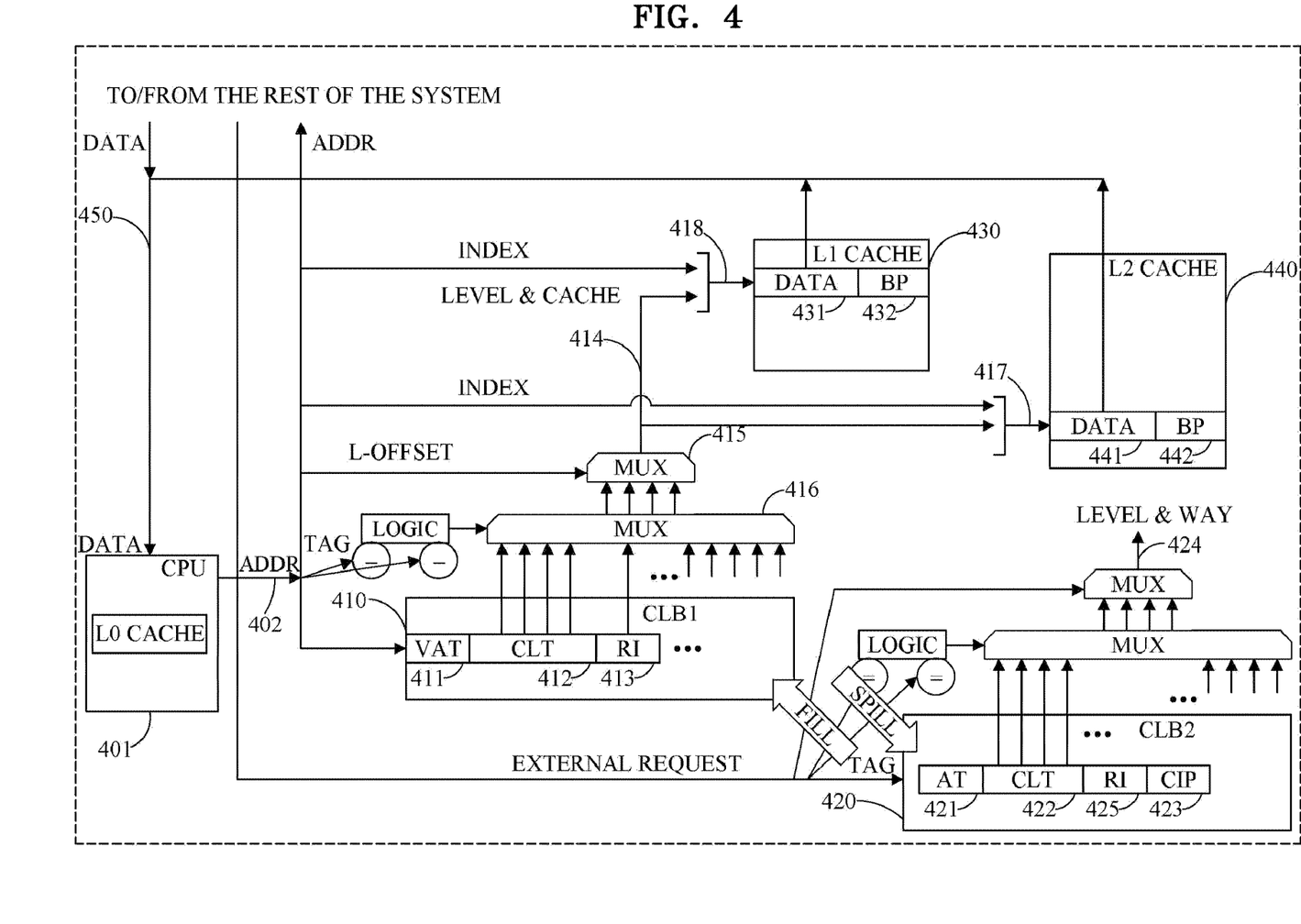
FIG. 4 is a block diagram illustrating an example embodiment of a system including a two-level cache hierarchy and a two-level cacheline address lookaside buffer (CLB) hierarchy, where the first level is virtually accessed and the second level is physically accessed.

FIG. 4 presents an example embodiment that includes a tag-less cache, which may rely on location information LI (sometimes referred to as cacheline pointers CP) corresponding to a requested cacheline of a matching cache table entry CTE (sometimes referred to as region location entries) to indicate in which cache, as well as in which location within that cache, the requested cacheline resides. This will cause embodiments to perform a direct cache lookup at the appropriate cache.

For example, the example system of FIG. 4 shows a tag-less node in an example multiprocessor system, in which the location information may be usable to distinguish between L1 cache and L2 cache. The location information may also be usable to distinguish between other caches present in the rest of the example multiprocessor system, not shown in FIG. 4. It may also be able to identify the associative way within a cache where the requested data is stored. The example tag-less node shown in FIG. 4 may be connected to other nodes in the example multiprocessor system, with a two-level cache hierarchy of set-associative caches and a CPU (which may contain one or many caches, here depicted L0), where CPU 401 generates addresses (ADDR) 402. In an example embodiment, ADDR 402 is a VA. In another example embodiment, ADDR 402 is a PA. FIG. 4 also shows a two-level cacheline address lookaside buffer (CLB) hierarchy of set-associative CLBs, where CLB1 410 and CLB2 420 are indexed with ADDR. Each entry in CLB1 comprises at least an address tag (AT) 411, a cache location table (CLT) 412. In an example embodiment, AT 411 stores a portion of a virtual address and in a different embodiment AT 411 stores a portion of a physical address. The entry may store additional information, such as region information (RI) 413. The CLT stores location information (LI) for the cachelines of a corresponding region (also referred to as a micropage). FIG. 4 shows four LI per region as an example. Empirical studies by the inventors shown that 8 to 16 LI per region (e.g., 8 to 16 data units and/or cachelines per region) to be cost-effective and efficient. The location information encodes the location where the corresponding cacheline may be found within a multiprocessor system. The location information may, for example, contain the identity of a cache where the data unit may be found. The location information may also contain a location within that cache where the data unit may be found, known as its way information in an associative cache. Alternatively, the location information may contain the identity of a node where the data unit may be found and/or may contain a symbol that provides information about its location. For example, the symbol "MEM" may indicate that the data unit may be found in memory. In an example embodiment, the symbol "don't know" indicates that the location of the corresponding data unit is not recorded in the CLT corresponding to the region.

The region information (RI) 413 stores attributes that are applicable to the region. This could for example be a physical address of the region (or a portions thereof) and some region classification information (e.g., encoding if the region only resides in this CLB and no other CLBs).

MUX 416 selects the CLT with an AT 411 matching a TAG portion of the ADDR 402 and a MUX 415 selects the LI 414 corresponding to the requested cacheline based on the LI-OFFSET portion of ADDR 402. If the cache identity stored in the selected LI corresponds to the L2 cache 440, an address 417 for accessing the requested data unit in L2 cache 440 is formed using an INDEX portion of the address 402 and a portion of the location information 414. In the example of a set-associative L2 cache 440, that portion contains information corresponding to the associative way where the requested data unit is stored. In an example embodiment, the L2 index is formed using a portion of ADDR 402 and some of the physical address stored in region information RI 413. If the cache identity stored in the selected LI corresponds to the L1 cache 430, an address 418 for accessing the requested data unit in L1 cache 430 is formed in a similar way.

For a cache hierarchy comprising a set-associative cache with the same associativity, the number of bits in each LI is dependent on the number of ways and number of caches of the cache hierarchy covered by the CLB. One LI value may be reserved for an invalid pattern ("MEM"). In this implementation, the number of LI bit(s) is equal to the log base 2 of the number of way(s) plus the log base 2 of the number of cache levels covered by the CLB plus one (e.g., $\log_2$ (way)+$\log_2$ (levels)+1)). If the number of ways of the different cache levels varies, or if caches other than set-associative caches are used, other LI representations may be possible. In example embodiments, the size of LI may be much smaller than the size of an address tag. A 2-level cache hierarchy with 16-way associative caches at each level may be encoded using 6 LI bits.

FIG. 4 shows an example embodiment where each entry in the L1 cache 430 and L2 cache 440 to have a backwards pointer (BP), 432 and 442 respectively, associated with its cacheline. (DATA), 431 and 441 respectively. In different embodiments, the BP pointers point to their respective associated CTE in CLB2 420 or in CLB1. Each CTE in CLB2 420 contains an address tag (AT) 421, a CLT 422, a CLB1 Pointer (CIP) 423, and region information (RI) 425. If the CLB2 entry has a corresponding CLT residing the CLB1 410, its CIP will point to that entry. In that case, CLB1 410 will contain the up-to-date information for this region. In that case, the CLE in CLB1 is identified as the active CLB entry, while the CLB entry for the region in CLB2 420 contains a passive entry. CLB2 420 may provide level and way information to one or more multiplexers (MUX) 424. In an example embodiment, CLB2 420 may contain a passive entry for a region if CLB1 410 contains an active entry for the region.

In an example embodiment, when no matching CTE may be found in CLB1 410, a corresponding CTE is looked for in CLB2 420 and copied to CLB1, while an old entry in CLB1 copied to CLB2 420. These operations may referred to as "spill and fill" or simply "spill/fill," which are represented as SPILL and FILL in FIG. 4. A spill may occur when an inclusive cache evicts a data unit to the next level to make space for a new data unit, which may be brought in (fill) from the next cache level. A similar spill/fill activity will be performed between the different CLB levels, where CLB entries are moved between the CLB levels, since the CLB levels forms an inclusive hierarchy. In an example embodiment, a directory DIR is at the root of the CLB hierarchy and spill/fill with the highest level CLBs.

In an example embodiment, it is possible to initiate access to the requested data unit in parallel with the spill/fill activity.

In an example embodiment, the CLB hierarchy is inclusive, but the cache hierarchy L1 430, L2 440 and higher-level caches does not impose inclusion. One or more caches may return 450 data to the CPU 401.

In an example embodiment, the contents of the CLBs of a multi-level CLB implementation are kept consistent with the locations of the data units of the multi-level cache system they manage. A data unit that is moved in the cache hierarchy, including but not limited to movements caused by requests for the data unit from the CPU, evictions of the data unit, prefetching activities and coherence activities, cause an update to its corresponding location information in one or many of the CLBs. For example, in FIG. 4, evicting a data unit 441 from L2 cache 440 may involve the steps of following its associated BP 442 pointer to find its corresponding CTE, which may reside in the CLB2 420, and updating its corresponding location information to point to the data unit's new location (e.g., storing the MEM symbol). If the CIP pointer of the corresponding CLB2's CLE is valid, following the CIP to find its corresponding CTE in the CLB1 410 and updating its location information associated with the cacheline. In an example embodiment, the entry in the CLB2 is not updated if there is a valid CIP pointer. In an example embodiment, only active CLTs are updated.

In example embodiments using tag-less cache systems (e.g., cache systems where the data unit stored in a caches does not have an address tag associated with it), a number of different types of transactions may occur when various cachelines located in different storage devices are requested by a CPU 401. For example, the node depicted in FIG. 4 may be a subsystem (or node) of a larger multiprocessor system comprised from several such cache nodes. Keeping the data of the caches in the many nodes coherent may involve a cache coherence protocol, which may include snooping and/or directory-based coherence. The coherence protocol may send coherence requests to the depicted node in FIG. 4 (EXTERNAL REQUESTS). These requests may first turn to CLB2 420, which may determine that this cache system does not have the requested cacheline (CLB2 miss or a CLB2 hit to an entry with an inactive CIP and the location information of the requested cacheline holding the value memory pattern). If so, no further action is involved with respect to the data caches L1 and L2 (known as coherence filtering), but the corresponding LI in the active CLT may be updated to track a new location associated with the data unit. Otherwise, the CLB2 lookup may provide the requested location information (CLB2 hit and the location information of the requested cacheline holding storing the location of the cacheline), or it may determine that CLB1 410 stores the associated location information (CLB2 hit and a valid CIP). In the latter case, a lookup in CLB1 410 may determine either the location of the requested cacheline or that the cacheline does not reside in this cache sub-system. The corresponding location information in CLB1 contains a memory pattern. Depending on the nature of the coherence request, for example an invalidation request, a read request, or an exclusive read request, the coherence protocol may perform some operations on the requested data unit and possibly change its state. The corresponding LI in the active CLT may also be updated to track a new location associated with the data unit Even though the node shown in FIG. 4 comprises two cache levels, in example embodiments, nodes may be assembled using other number of levels and may contain more than one CPU. Furthermore, in example embodiments, the number of cache levels and the number of CLB levels in a node may vary.

Figure 5:
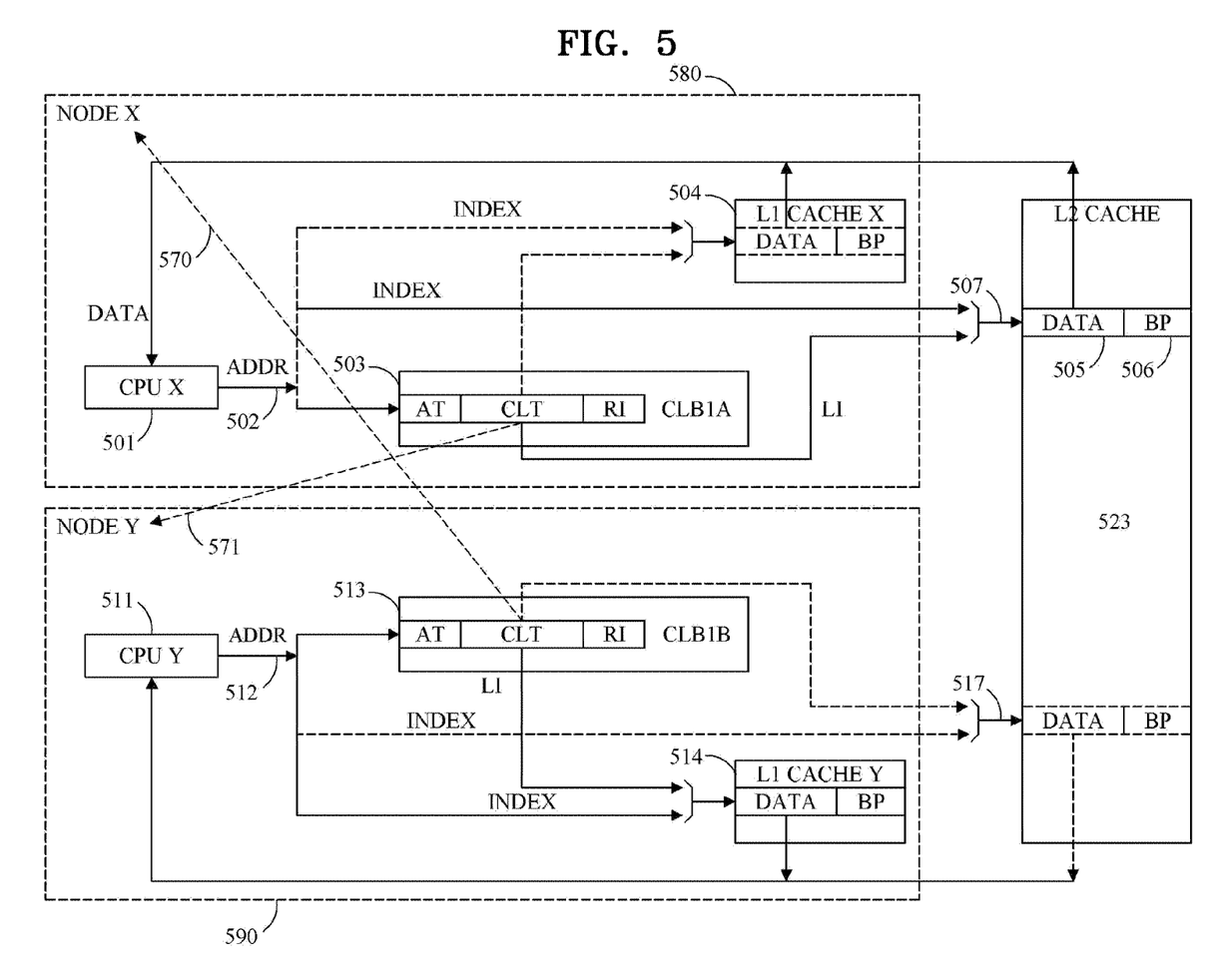
FIG. 5 is a block diagram illustrating an example embodiment of a system including two CPUs connected to a two-level cache hierarchy and a two-level cacheline lookaside buffer hierarchy.

Example embodiments may also be applied on systems with several CPUs sharing a cache managed by the CLBs. For example, FIG. 5 shows an example system built from two CPU nodes (580 and 590), each within their own one-level cache hierarchy with one CLB1 (CLB1A 503 and CLB1B 513) and a private cache L1 cache (504 and 514) according to an example embodiment. The example system of FIG. 5 also contains a shared L2 cache 523 (sometimes referred to as a last-level cache LLC), which is shared between the two CPUs 501, 511. In the example system of FIG. 5, the shared L2 cache 523 includes entries featuring data 505 and a backwards pointer (BP) 506.

A lookup in a CLB1 (513 or 503) selects a single LI based on an address 502, 512 generated by their respective CPUs (501, 511), for example using techniques similar to CLB1 410. As indicated by the three arrows (including 517) initiated by the two shown CLT entries in CLB1A 503 and CLB1B 513, the selected LI may identify the location to be either in the corresponding L1 cache (504 and 514 respectively), in the L2 cache 523 or in the other node (showed by 570 and 571 respectively). In this example, CLB1A 503 identified accessed data 505 in the shared L2 523, while CLB1A 503 identified its accessed data to be 505 in its L1 514 (show by the solid arrows). If the other nodes are identified to store the data, lookups in their CLBs are performed to determine the exact location of the requested cacheline within their private cache(s).

It may be advantageous to reduce the existence of sidedoors in computer systems that may allow for security attacks, such as Spectre, Meltdown, and other side-channel attacks.

Processors execute independent instructions out of order in an effort to hide latency resulting from busy functional units or memory access latency. In example embodiments, rather than stall, processors may attempt to schedule subsequent operations in the instruction stream to available functional units. Upon completion, instructions are queued in a reorder buffer (ROB). Instructions are officially committed and made externally visible to other processors and/or processor cores in the system when they retire from the ROB. Instructions may only be retired from the reorder buffer when all previous instructions have retired.

Some aspects of speculative execution are now discussed that may relate to the security of caches.

Referring to the example computer system of FIG. 1, CPU 101 may execute instructions more quickly than it may access the caches and the memory. To compensate for this, the CPU may perform speculative work. Examples of speculative work include starting the execution of instructions along an execution path which may be the wrong path, executing instructions in an order different than program order and prefetching data into the cache prior to the first request for the data.

In some processing architectures, processors may speculate the next instruction to fetch in the program, in the event of a branch or function call, and/or the value that should be returned by a load. In some such scenarios, processors evaluating a first instruction cannot determine whether or not a next instruction in a program should be executed. This scenario may result from a delay in translating a virtual address to a physical address and subsequently checking access permissions of the location. As an example, if the next instruction in a program attempts to access memory location A via a read operation, it may take some time to determine whether or not the program has permission to do so. While the processor is waiting to see if it has permission to read A, it may speculatively execute the read as long as it "erases" the software-visible effects of the read if it is eventually determined that the access was not permitted.

In some scenarios, speculation may result from a misspredicted branch. Branch prediction is a technique that processors use to reduce the number of speculative instructions that are not executed. Branches involve the calculation of a branch target. Conditional branches additionally involve the evaluation of a branch condition to determine whether or not to "take" the branch. One The Branch Target Buffer (BTB) may stores a mapping from addresses of recently executed branch instructions to branch target addresses. Another hardware component, which maintains a record of the recent branch outcomes, is used to determine whether the branch is taken or not.

The Spectre and Meltdown attacks utilize CPU caches as a significant source of information leakage. Cache-based side-channel attacks are security exploits where an adversary exploits cache behavior to acquire knowledge about a victim program as it executes, and then acts on that knowledge to attack the host system. Specifically, these scenarios rely on the attacker being able to differentiate between cache hits and misses.

Some cache-based attacks may leverage timing channels as part of an attack vector. These timing channels may utilize measurable memory and/or page table access latency differences to monitor victim behavior. Examples of timing attacks include Prime+Probe and Flush+Reload.

In a Prime+Probe attack, an attacker first primes the cache by populating one or more sets with its own cachelines and subsequently allows the victim to execute. After the victim has executed, the attacker probes the cache by re-accessing its previously-primed cachelines and timing these accesses. Longer access times (i.e., cache misses) indicate that the victim has touched an address, mapping to the same set, thereby evicting the attacker's cacheline.

A Flush+Reload attack may have a similar goal to Prime+Probe, but may rely on shared virtual memory between the attacker and victim (e.g., shared read-only libraries or page deduplication), and the ability to flush by virtual address. In a Flush+Reload attack, an attacker may identify a specific cacheline, rather than just a cache set. In Flush+Reload, and may begin by flushing the shared cacheline(s) of interest, and subsequently allowing the victim to execute. After the victim has executed, the attacker may reload the previously evicted cacheline(s) while timing the duration of the access to determine if the cacheline was pre-loaded by the victim.

Meltdown and Spectre represent a class of recently discovered cache timing side-channel attacks that leverage the effects of out-of-order and speculative execution on cache state. Meltdown breaks the mechanism that keeps applications from accessing arbitrary system memory. Spectre mis-trains branch predictors in modern processors in order to trick applications into accessing arbitrary locations in their memory. After inducing speculative execution, both attacks use timing side channels (specifically, Flush+Reload) to identify which addresses were speculatively accessed by the processor. By inducing speculative execution of a non-privileged read access that is dependent (via address calculation) on a prior privileged read access, the attacks may be able to access privileged kernel memory.

The Meltdown and Spectre attacks reveal that a CPU cache may be polluted by speculatively executed instructions. Even if software-visible effects of a speculative instruction are erased, microarchitectural effects may remain. Additionally, the Meltdown and Spectre attacks demonstrates that software dependencies may be leveraged from victim memory accesses to attacker memory accesses, such that the attacker may increase the scope of addresses on which an Flush+Reload attack may be performed to include non-shared memory locations in addition to shared memory.

To summarize, various cache implementations, including the example systems depicted in FIGS. 1-5, may be vulnerable to side-channel attacks, including Spectre and Meltdown, due to the microarchitecture state changes (e.g., caused by the speculative execution of instructions that later should not get executed) that are observable by their own process and sometimes also by other processes that are not permitted to access the data.

It may be advantageous to design cache systems to reduce vulnerability for security attacks, such as side-channel attacks. Some cache systems may involve a consideration of whether a process executing a memory instruction is allowed to perform this memory instruction to its accessed address. In some cache systems, no access permission checks are performed when a memory instruction is issued. Instead, the access permission check is performed when the instruction commits, at least for some memory instructions. Access permission may be checked by the TLB. The access permission may change over time (e.g., through a TLB invalidation that invalidates one or several entries and forces the TLB to be reloaded on the next access), and the access permission may only be applied at commit time. While late access permission check may be acceptable from an architectural standpoint, late permission checking may permit unpermitted speculative instructions to change the state of the cache, which may allow secret information to be leaked between processes.

The example embodiments, including the examples depicted in FIG. 3 and FIG. 4, may be extended with extra fields to implement embodiments associated with securing cache systems.

In an example embodiment, the payload of each entry of TLB 303 of FIG. 3 is extended to also encode access permission for accesses to the region. The TLB 303 is accessed using the full virtual address for address 302, possibly including any Process ID (a.k.a. Address Space Identifier, ASID), Virtual Machine ID (e.g., VMID) and possibly other specific extensions to the virtual address. The address tag AT 311 is also extended to store the corresponding bits of the full virtual address. The access permission in CLB is checked when a memory instruction is issued. Access permission violations results in no cacheline movement or state changes in the cache hierarchy and the CPU being informed about memory instructions violating the access permission.

In an example embodiment, the region information RI 413 of FIG. 4 is extended to also encode access permission for accesses to the region. CLB1 410 is accessed using the full virtual address for address 402, possibly including any Process ID (a.k.a. Address Space Identifier, ASID), Virtual Machine ID (e.g., VMID) and possibly other specific extensions to the virtual address. The address tag AT 411 is also extended to store the corresponding bits of the full virtual address. The access permission in the CLB is checked when a memory instruction is issued. Access permission violations result in no cacheline movement or state changes in the memory hierarchy and the CPU being informed about memory instructions violating the access permission.

In an example embodiment, performing an access permission change for a region or page (e.g., a TLB invalidate) also involves removing (or by some other mean invalidating) corresponding entries in the CLB1 410. However, the cachelines in L1 cache 430 and L2 cache 440 pointed to by the Location Information (LI) stored in its CLT 412 may be evicted (sometimes referred to as forced eviction).

Figure 6:
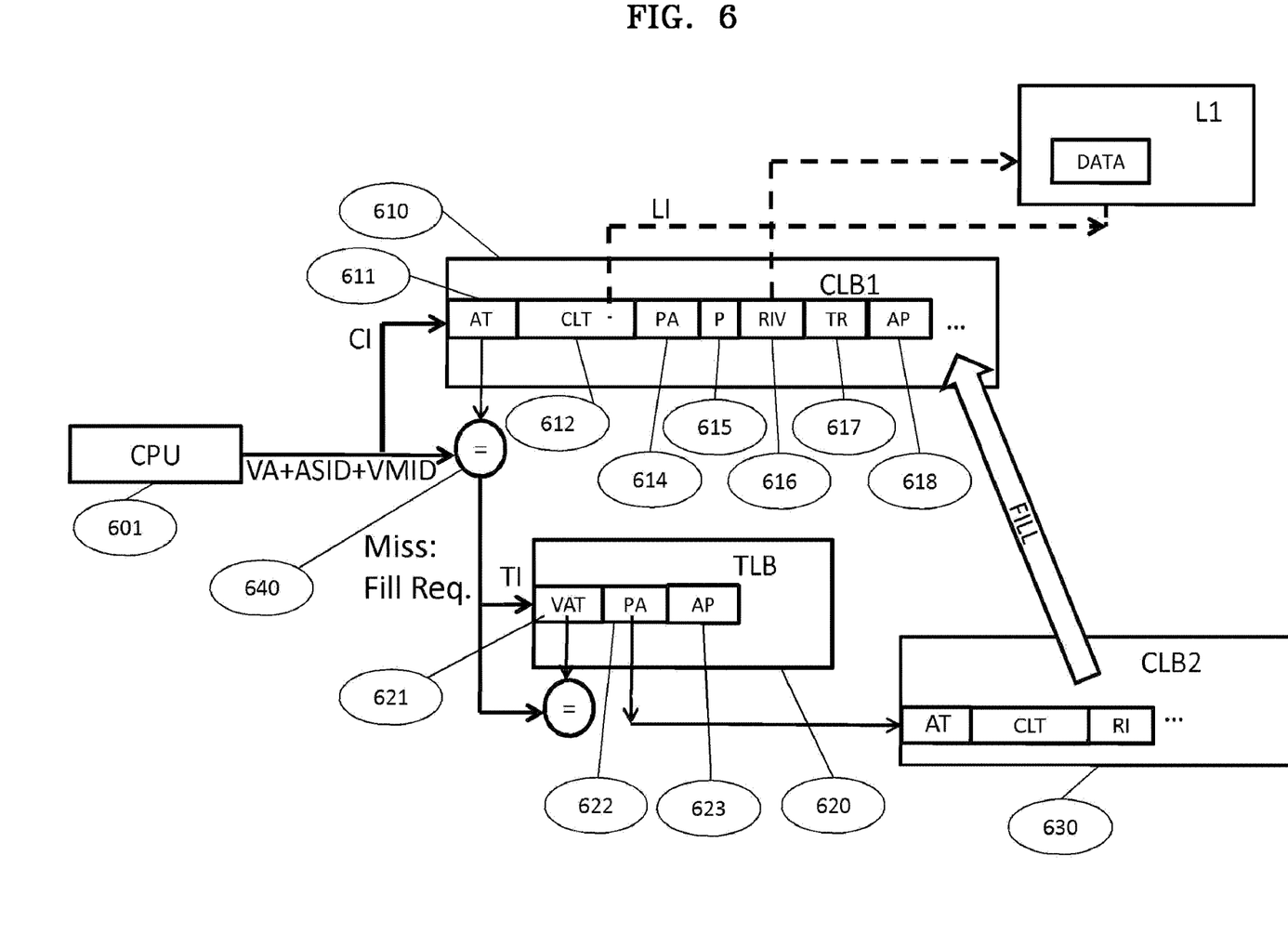
FIG. 6 is a block diagram illustrating an example embodiment illustrating an extended implementation of the CLB1 of FIG. 4.
Figure 7:
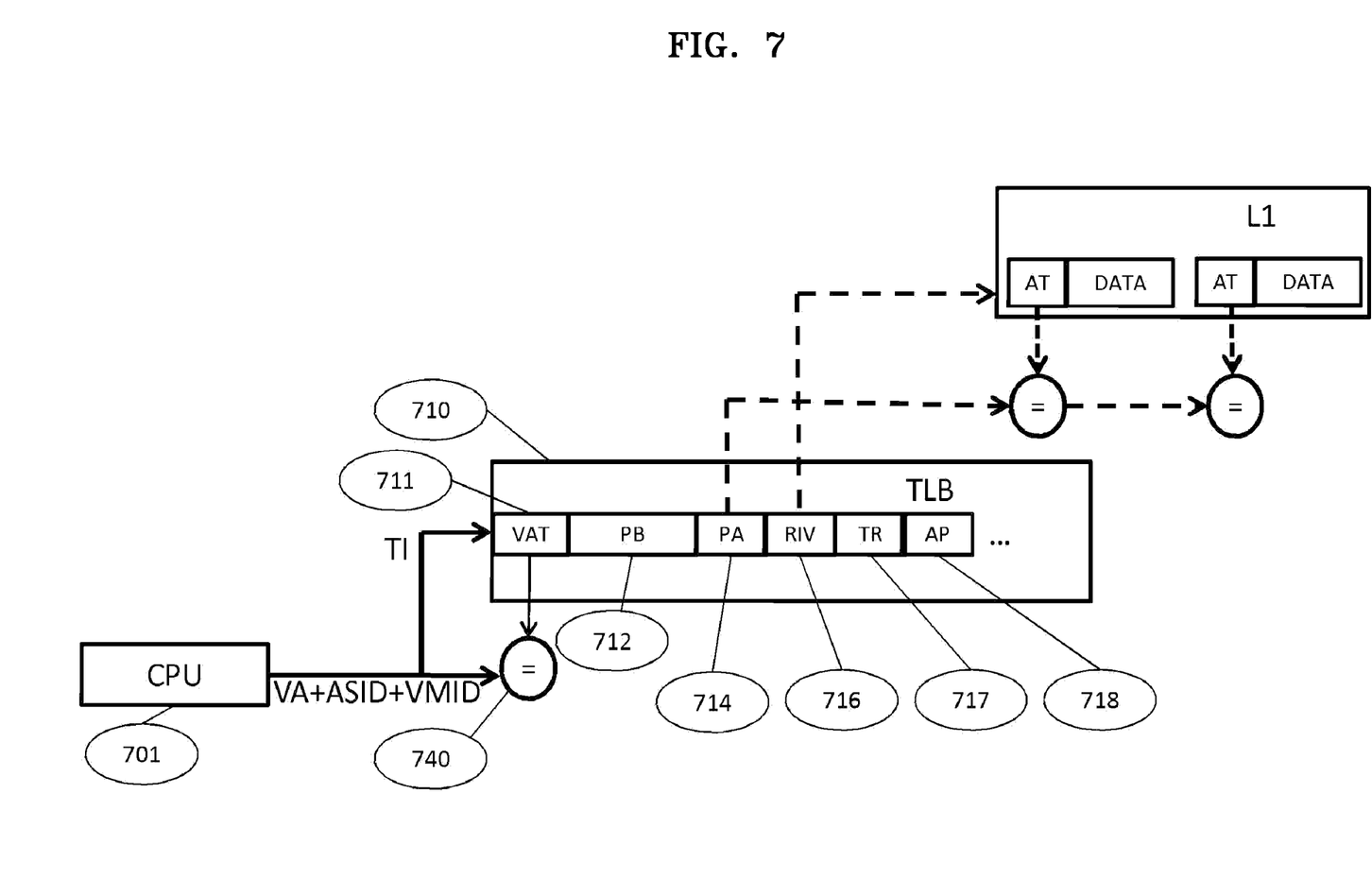
FIG. 7 is a block diagram illustrating an example embodiment illustrating an extended implementation of the TLB of FIG. 3.

In an example embodiment, performing an access permission change (e.g., a TLB invalidate) for a system with tagged caches also involves removing (or by some other mean invalidating) corresponding entries in the TLB 303 depicted in FIG. 3. The extension to FIGS. 3 and 4 discussed above, which may enable efficient changes of access permission, is depicted in FIG. 7 and FIG. 6 respectively and described in more detail below.

In an example embodiment, filling a CLB1 410 entry from CLB2 420 (the FILL arrow in FIG. 4) also includes the step of accessing a TLB (not shown in FIG. 4). The access permission read from the TLB is stored as the access permission AP in the extended Region Information (RI). The Region Information is also extended to store a TLB Reload bit (TR). When CLB1 410 receives an access permission change (e.g., a TLB invalidate), it sets the TR for the corresponding regions, but do not evict or invalidate the CLB entry. This will force a new TLB reload (accessing the TLB used during the CLB1 410 fill) to read the (possibly modified) access permission bits. However, since the CLB1 410 entry is not removed or invalidated from the CLB1 410, no cachelines may be evicted.

In example embodiments, additional mechanisms may be included to handle access permission change between the time a memory instruction is issued and later is committed. In an example embodiment, if the access permission is changed (possibly by receiving a TLB invalidations, between the time the initial cache-access permission is checked and the time the instruction is committed), the pipeline will re-check its access permissions. This may apply to the extended functionalities of tagged caches, such as shown in FIG. 3, and/or tag-less caches, such as shown in FIG. 4. In an example embodiment, this is implemented by setting a RECHECK bit for each in-flight instruction (i.e., instructions between issue and commit) when an access permission change to CLB1 410 and TLB 303 respectively occurs. Only if the RECHECK bit is set, it is necessary to recheck the access permission at commit time (e.g., by performing a TLB 303 lookup in FIG. 3. or a CLB1 410 lookup in FIG. 4 respectively). In another example embodiment, in-flight instructions that are affected by the access permission change are identified and these instructions are forced to re-check their permission at commit time.

In example embodiments, a portion of the cache may include a random index value (RIV) that is associated with a cacheline stored in the cache, and that is used to identify the location of the cacheline in a memory of the device. The random index value (RIV) may be stored in the Region Information (RI) 413 for a region. The number of RIV bits stored in this field could for example vary from a single bit up to the largest number of bits used to index a cache in the system. In an example embodiment, RIV is initialized to store a random value not known to an application. In an example embodiment, the RIV may be used to determine the index to be used when a processor accessing a cache. In an example embodiment, a random index value is formed by XORing the RIV bits with some address bits to calculate the cache indices or some other logical transformation of the bits. The RIV bit may also be used directly as index bits to a cache, without any logical transformation. It is possible to have some caches in the system rely entirely on address bits for their indexing while other caches rely on random indexing.

In an example embodiment, TLB 303 may also add a field with a random index value (RIV) to its payload. All the cachelines for that page may use the RIV to calculate their index. (Assuming a page size of 4 k bytes and a cacheline size of 64 bytes, each page has 64 cachelines.) In an example embodiment, a presence bit (PB) field may be added to the TLB 303 payload, storing a number of bits that corresponds to a number of cachelines on a page (e.g., 64 bits).

Assuming now that the RIV indexing is only applied to one cache level (e.g., L1), each time a cacheline is stored in that cache, the corresponding PB bit is set and each time it is evicted the bit is cleared. That way, the TLB may tell when the last cacheline of a set gets evicted. In an example embodiment, when a TLB entry is evicted, any cacheline still residing in L1 is also evicted. However, assuming a much larger TLB reach than the L1 size, this should not produce much of a performance problem. Actually, knowing which TLB entries that still have valid L1 cachelines could prompt the replacement logic of the TLB to refrain from replacing an entry with a cacheline present in the L1 cache, and may instead select another TLB entry for eviction, which may improve performance.

FIG. 6 shows an example embodiment of how CLB1 410 of FIG. 4 may be extended with more region information as discussed above (the extended CLB1 referred to as 610). Some of the components in FIG. 4 that do not change have been omitted in FIG. 6 for clarity. The virtual address, possibly composed by VA+ASID+VMID is produced by CPU 601. Part of the virtual address (CI) is used to index CLB1 610 and part of it is compared with all the address tags (AT) 611 of the CLB1 610 entries stored in the indexed set (only one entry is shown). Each entry contains the field's cache location table (CLT) 612 (storing LIs for the region's cachelines), physical address (PA) 614, region classification bit (P) 615, random index value (RIV) 616, TLB reload bit (TR) 617 and access permission (AP) 618. A portion of the virtual address produced by the processor is compared 640 to the AT 611 of all the entries in the set. If there is a match, the fields of that entry are used to access the RIV 616 of the corresponding region, which is used to, at least in part, index an L1 cache, and the location information (LI) of the corresponding cacheline is used to find the correct cache level (e.g., the L1 cache) and the associative way within that cache.

If there is a miss (none of the ATs 611 of the indexed CLB1 610 set matched the address produced by processor 601), a lookup in TLB 620 is initiated to retrieve a physical address (PA) 622 and access permission AP 623. If there is a match in the TLB 620 with a virtual address tag (VAT) 621, the PA 622 of the matching TLB 620 entry is used to perform a lookup in CLB2 630 and use information from a matching CLB2 630 entry, together with PA 622 and AP 623, to create a new CLB1 610 entry. At the same time, a new random number is written to RIV 616, TR 617 gets unset, and P 615 is set if this is the only CLB1 620 entry in the system.

FIG. 7 shows an example embodiment of how TLB 303 of FIG. 3 may be extended with more fields for each of its entries (depicted by TLB 710). The virtual address composed by VA+ASID+VMID is produced by CPU 701. Part of the virtual address (TI) is used to index TLB 710 and part of it is compared 740 with a virtual address tags (VAT) 711 of the TLB entries stored in the indexed set (only one entry is shown). Each entry contains the fields presence bits (PB) 712 (storing one bit per cacheline of the page), physical address (PA) 714, random index values (RIV) 716, TLB reload bit 717, and access permission (AP) 718. A portion of the virtual address produced by the processor is compared to the virtual address tag VAT 711 of all the entries in the set. If there is a match, the fields of that entry are used to access the memory hierarchy. RIV 716 is used to index a cache L1 cache to find the appropriate set and the address tags (AT) of all cachelines of that set are compared with a portion of the physical.

The TLB 710 depicted in FIG. 7 is similar to the CLB1 610 of FIG. 6 in that both store PA, RIV, AP, TR and also some per-cacheline location information (e.g., PB 712 stores information about which cachelines of the page which are stored in L1). Thus, TLB 710 may be regarded as a form of cache location buffer (CLB).

The following sections outlines how the features of the example embodiments described above may reduce various security attacks. The following description is applicable to both the example embodiments described by FIGS. 6 and 7, as well as other example embodiments.

The Meltdown attack involves inter-process attack, in which an attacking process may prompt an attacked process to speculatively access the attackers' address space and leave traces in the micro-architecture state that may reveal secrets. The Meltdown attack relies in part on the fact that unpermitted speculative instruction are allowed to affect the microarchitecture state. The early permission checks performed at issue time, as suggested for the extensions leading up to both FIGS. 6 and 7 would be sufficient for reducing such attacks (even though other parts of an architecture implementation, such as shared branch predictor state, may also be fixed).

The Spectre attack involves side-effects of speculative accesses to a process' own address space may reveal data from one part of the process to part of the code of the process that has been designed to not be able to access it. One such example is in enabling code to cross out of a security isolation construct, such as a just-in-time (JIT) execution sandbox, and access data in the process that should be out of bounds due to the security isolation construct. This security hole is enabled by allowing micro-architecture side-effects caused by speculative (and later not executed) accesses to be observable by non-speculative accesses (which are executed), such as by measuring timing to determine if the data was stored in the cache.

Examples of attacks that may take advantage of this type of speculation include flush+reload, which relies on being able to non-speculatively hit on speculatively loaded data, and prime+probe, which relies on speculatively loaded data evicting non-speculatively loaded data.

In flush+reload, an attacker empties the cache of a selected set of data and then causes data it controls to be speculatively loaded into the cache via an indirection from the speculative load (e.g., load controlled_data[speculative-_data].) The attacker may then time accesses to all the elements in its controlled data to see which one was cached, and thereby infer the value of the speculative data. This attack may succeed if the speculatively loaded data is accessible to non-speculative loads.

In prime+probe, the opposite approach is used. First, controlled data is loaded into the cache in such a way that some of the index bits in the cache of each controlled data element is known. The attacker then loads speculative data into the cache, which evicts one of the controlled data elements. The attacker can then time loading each of the speculative data elements to determine which one was evicted, thereby gaining information about the speculative information. This attack to succeed if the speculatively loaded data evicts non-speculatively loaded data.

Such attacks may be reduced by distinguishing between speculatively loaded data and non-speculative data, optionally while reducing a performance cost of preventing speculative loads. That is, speculative data may be fetched from DRAM on speculation, but its effects in the cache hierarchy may be made visible only when it is no longer speculative.

Part of the prime+probe attack involves the fact that the attacker knows the cache index for each cacheline with the respect to a specific cache level. Such an attacker may fully populate one or many of its sets before the attack and then time the accesses to the primed cachelines after the attack to deduce some secret information about the cache. However, if the random index value for the cachelines is not known, it may become more difficult to populate the sets and/or to deduce the secret information based on the timing of certain accesses after the attack. Example embodiments described herein may use the random index value (RIV) field of CLB1 610 region and TLB 710 entry, respectively, to reduce such attacks. The RIV may include a random number that is not known to an application (including the attacker) and that may be used, at least in part, to produce the index bits for a cache access.

FIGS. 6 and 7 show cache system utilizing RIVs to produce a random cache index. As described earlier, a random index value 616, 716 in CLB1 610 and TLB 710 respectably is initially set to a random number not known to any application. The following description is based on the FIGS. 6 and 7.

Changing the random index value periodically may further reduce prime+probe attacks. Random indexing may also make it harder to design side-channel "prime+probe" security attacks, since the index for the spied upon data, as well as for the malicious probing accesses, is not readily known. Such an attack involves determining the dynamic indexing of enough regions to fill a set before the attack can be set up. Dynamic indexing may increase the difficulty of an attack (e.g., increasing the time), including by actively changing the dynamic indexing of a cacheline at a rate faster than an attacker may access the cacheline.

In an example embodiment, the random index values for region in CLB1 610 and TLB 710 may be dynamically changed at a selected rate. When a random index value is changed, the cachelines pointed to by the region's location information (LI) may be copied to the new set identified by the new random index value.

In an example embodiment, the random index value for a region can be changed to a new random number when the last cacheline pointed to by its LIs, or recorded by its PBs respectively, is removed from the caches that use the random index value to calculate their random index values. In this situation, the random index value can be changed to a new random value without moving any cachelines. For example, referring to FIG. 6, if a random index value 616 field of CLB1 610 is only used to calculate the random index value 616 for L1 cache 630 and a CLT 612 determines that the last cacheline of a region was evicted from L1 cache 630, then the random index value 616 for the CLT's region can be changed to a new random number without moving any of the cachelines in L1 cache 630. Similar examples for FIG. 7 rely on PB 712 to determine when the last cacheline for one of its pages is evicted to allow for an efficient random index value 716 update.

In an example embodiment, the system detects regions that have had not had their random index value changed for as selected time period to get their random index value changed, even though some of their cachelines may be relocated as a consequence of the random index value change. This allows for a selected random index value change period while limiting the relocation of cachelines to regions/pages with data resident in L1 for a longer period of time.

Tag-less caches may exhibit higher associativity, since the cost for its associativity only grows the size of its LI logarithmically. For example, doubling the associativity of all caches may be achieved with one more LI bit. High-associativity by itself makes "prime+probe" side-channel attacks linearly more costly.

With higher-associativity cache organization, the replacement algorithm becomes less impactful, allowing tag-less caches to readily support random replacement. As many side-channel attacks utilized the knowledge of a replacement algorithm (e.g., LRU) to set up their attack, switching to a random replacement makes them statistically harder to predict, leading to longer attack times. Approaches that not only replace data randomly, but also protect data randomly, may make it difficult to determine the random index value. While random replacement can expect to produce a less efficient cache behaviour, a large associativity will make the performance difference relatively small compared with optimal replacement.

The lack of inclusion may allow tag-less caches to reduce storing speculative data throughout the cache hierarchy. In some example computer systems, speculative loads may leave a trail of occurrences of storing and/or removing data at each level as the data is brought in. Tag-less caches may allow arbitrary data caching policies, which may facilitate placement of speculative data in a cache without affecting other caches. Such placement may reduce the amount of data that is leaked, and/or promote flexibility for isolating speculation in a way that makes it easier to control its effects and how it can be observed.

While each of these properties of cache design can help reduce such attacks, example embodiments may combine them in a way that may enable speculative prefetching of data for performance, while preventing speculative accesses from becoming visible as evicting non-speculative data (prime+probe) and/or as hits from non-speculative accesses (flush+reload).

The lack of inclusion and the ease with which tag-less caches can track data in multiple levels may enable tag-less caches with separate speculative cache that may reduce speculative accesses.

In example embodiments, speculative loads may be stored exclusively in the speculative cache, thereby reducing eviction of non-speculative data from the rest of the memory hierarchy (prime+probe). Hits on data in the speculative cache from other loads may be reduced, which may reduce detection by non-speculative accesses (flush+reload). When the pipeline has committed and/or retired the load, and it is assured to be non-speculative, the data from the speculative cache can be moved into the regular hierarchy safely to achieve the performance benefits of speculative prefetching. In some implementations, the conversion to non-speculative can be made before the instruction commits. In an example embodiment, the conversion to non-speculative is done as soon as it can be determined that the instruction is no longer speculative and is to be executed.

The introduction of RIV into CLB and TLB respectively may allow the protection of a cache hierarchy from such attacks by reducing hits on speculatively loaded data and/or making it difficult to learn from evictions caused by speculative loads (prime+probe). This approach may combine the effects of high associativity, random indexing, and lack of forced inclusion to provide a safe zone cache for loading and storing speculative data. Speculative loads can be stored in the safe cache, and are marked as speculative. Once the speculation is resolved, the data can then silently be evicted if miss-speculated. Else, its marking as speculative gets unset and from this point in may also be stored in the rest of the cache hierarchy.

In example embodiments, an L1 cache can be designed to reduce side-channel attacks. In an example embodiment, an L1 cache may exhibit 32-way associativity, random indexing, random replacement and tracking of speculatively loaded data. Tracking data that is speculatively loaded may reduce hits on speculative data, which may reduce flush+reload attacks. Reducing prime+probe attacks may involve choosing random index values that are difficult to determine, which may permit increasing the associativity and using random index bits to obscure where data is stored in the cache.

In example embodiments, a random index value of a region may be changed occasionally. For example, if an attacker determines the index of a region, the random index value may be changed before the attacker accesses the region. In example embodiments, one or more random index values may be changed at a selected period and/or frequency. In example embodiments, the period and/or frequency with which the random index values are changed may be selected based on the speed of an attack and/or a selected level of security. In example embodiments, a subset of regions may have random index values that are occasionally changed, as every time a region is first brought in or when the last cacheline in a region is evicted the index bits can be changed for free. If the dynamic index bits of a region change while it has data resident in the cache, those cachelines may be evicted and re-stored, but the L1 cache may not be searched for these cachelines as they can be found by looking at CLB entries with data present in the L1 cache.

In example embodiments, a cacheline returned for a memory request may not be installed in L2 cache when it is installed in L1 cache, due to the non-inclusive cache hierarchy. The cacheline may get installed L2 cache upon an L1 cache eviction and only if it is deemed appropriate to do so (e.g., guided by some cache placement heuristics). For speculative accesses, the cachelines may only be installed in safe L1 cache, and/or marked as speculative, which may reduce non-speculative accesses, while keeping them close to the processor and/or processor core to promote speculative prefetching. When the speculation is complete, and the instructions are determined to be executed, the cachelines may be moved into the appropriate location for future reuses.

In example embodiments, a state machine (SM) may bring the data to the safe cache, or into the speculative cache. In an example embodiment, the state machine may decide which cachelines to install in L1 cache and/or L2 cache, and also when to promote them. In some embodiments, the processor may inform the state machine when a memory request becomes non-speculative, e.g., when it is known that it can no longer be part of a malicious side-channel attack. If state machine is handling a long-latency DRAM access and all its preceding branches have been resolved (as well as other potential causes of not executing a speculative instruction), the processor may inform the state machine that the memory request is no longer speculative and that it can safely be installed in some other cache. If the cacheline is still deemed speculative when the data is returned from DRAM, the memory request is satisfied from L1 cache and the cacheline is marked as speculative.

For clarity, some descriptions herein describe techniques for how a cacheline may be located and/or returned to a requesting CPU. Some examples do not describe in detail the various ways in which a requested word contained within the cacheline is selected and/or returned to the CPU, but such details may be apparent to those skilled in the art.

For clarity, some descriptions herein describe the handling of data of cache hierarchies describe exclusive cache hierarchies. Those skilled in the art may understand that the described embodiments may be extended to cover inclusive memory hierarchies and non-exclusive memory hierarchies.

Although the example embodiments described above may be useful in association with both uni-processor systems and multi-processor system, such as those illustrated and described above with respect to FIGS. 1 and 2 respectively, the CLB according to the example embodiments may be illustrated in association with a uniprocessor system, but may also be utilized with multi-processor systems.

The subject matter of this disclosure, including the example embodiments discussed and/or presented in the Figures, may be implemented in a variety of architectures. In example embodiments, a cache may be stored in, accessed by, and/or controlled by one or more software components, such as a thread or process executing on one or more processors; a software library, such as a set of instructions stored in a memory and accessed by a process and/or thread of an operating system and/or application; and/or a set of instructions stored on a non-transitory computer-readable medium that may be executed by a processor. In example embodiments, a cache may be stored in, accessed by, and/or controlled by one or more hardware devices. In example embodiments, such hardware devices may include processing circuitry such as, but not limited to, one or more processors respectively having one or more processor cores. Such processors may include a Central Processing Unit (CPU); a Graphics Processing Unit (GPU); a core of a multi-core CPU or GPU; an arithmetic logic unit (ALU); a digital signal processor; a microcontroller and/or microcomputer; a System-on-Chip (SoC); a field programmable gate array (FPGA); a Programmable Logic Array (PLA); an Application-Specific Integrated Circuit (ASIC); a modular logical device, such as a packaged logic chip; and/or any other device capable of responding to and executing instructions in a defined manner. In example embodiments, a cache may be stored in, accessed by, and/or controlled by a combination of components of the same and/or different types, such as a plurality of processors and/or processing cores in a uniprocessor or multi-processor computer; two or more processors operating in tandem, such as a CPU and a GPU; a CPU utilizing an ASIC; and/or software executed by a processor. Example embodiments may comprise components of a single device, such a computer comprising one or more CPUs that store, access, and manage the cache. Example embodiments may comprise components of multiple devices, such as two or more devices having CPUs that communicate to access and/or manage a cache. Example embodiments may include one or more components that are included in a server computing device, a server computer, a series of server computers, server farm, a cloud computer, a content platform, a mobile computing device, a smartphone, a tablet, or a set-top box. Example embodiments may include components that communicate directly (e.g., two or more cores of a multi-core processor) and/or indirectly (e.g., via a bus, via over a wired or wireless channel or network, and/or via an intermediate component such as a microcontroller or arbiter). Example embodiments may feature multiple instances of cache managers that are respectively performed by a device or component, where such instances may execute concurrently, consecutively, and/or in an interleaved manner. Example embodiments may feature a distribution of an instance of a cache manager over two or more devices or components.

Example embodiments may include components, including the cache and computer-readable instructions, that are stored in memory. Non-limiting examples of memory include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of memory with a built-in rewriteable non-volatile memory, include but are not limited to, memory cards; and media with a built-in ROM, including but not limited to ROM cassettes; etc. Example embodiments may include and/or utilize memory devices that are be tangible or non-transitory computer-readable storage media, such as random access memory (RAM), read only memory (ROM), a permanent mass storage device (such as a disk drive), and/or any other like data storage mechanism capable of storing and recording data. Memory may be configured to store computer programs, program code, instructions, or some combination thereof, for one or more operating systems and/or for implementing the example embodiments described herein. Memory may include a Universal Serial Bus (USB) flash drive, a memory stick, a Blu-ray/DVD/CD-ROM drive, a memory card, and/or other like computer readable storage media. In example embodiments, a cache, computer program, program code, and/or instructions, or some combination thereof, may be loaded into one or more local memories and/or one or more local processors from a remote data storage device via a network interface. In example embodiments, a cache, computer programs, program code, and/or instructions, or some combination thereof, may be loaded from another local memory and/or another local processor or component.

Although described above in the context of certain example computer architectures, caching exists in many other settings within, as well as outside, a computer system and the foregoing embodiments are equally applicable to such other contexts. An example of such usages is a virtual memory system that caches data from a slow, high-capacity storage, such as a disk or FLASH memories, into a faster and smaller high-capacity memory that may be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism, the example embodiments described herein may be applicable for implementing the various caching schemes.

The disclosed embodiments describe, for example, systems and methods associated with various cache hierarchies. However, the example embodiments are intended to cover alternatives, modifications and equivalents, which are included in the spirit and scope of the invention. Further, in the detailed description of the example embodiments, numerous specific details are set forth in order to provide a comprehensive understanding of the invention. However, one skilled in the art would understand that various embodiments may be practiced without such specific details.

Although the features and elements of the present embodiments are described in the example embodiments in some combinations, each feature or element can be used alone without the other features and elements of the example embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for accessing data in a cache of a device, the method comprising:
   storing a random index value in a buffer;
   storing a cacheline in the cache at a location that is based at least in part on the random index value;
   storing in the buffer an access permission for the cacheline;
   for a memory instruction that involves the cacheline, determining whether the memory instruction is permitted to access the cacheline based at least in part on the access permission for the cacheline; and
   on condition of determining that the memory instruction is not permitted to access the cacheline, refraining from changing the cache.

2. The method of claim 1, further comprising:
   on condition of changing the access permission for the cacheline, invalidating the cacheline in the cache.

3. The method of claim 1, wherein,
   the buffer includes a cache table that includes a cache table entry that identifies a region of the cacheline in a memory of the device, and
   storing the access permission for the cacheline includes storing the access permission in the cache table entry for the cacheline.

4. The method of claim 1, wherein,
   the buffer includes a cache table including a cache table entry that identifies a region of the cacheline in a memory of the device and region information for the cache table, and
   storing the access permission for the cacheline includes storing the access permission in the region information for the cache table.

5. The method of claim 1, further comprising:
   on condition of changing the access permission of the cacheline after determining that a pending memory instruction is permitted to access the cacheline, redetermining whether the pending memory instruction is permitted to access the cacheline based at least in part on the access permission.

6. The method of claim 1, further comprising:
   on condition of determining that the memory instruction is permitted to access the cacheline, accessing the cacheline by determining the location of the cacheline based at least in part on the random index value.

7. The method of claim 6, further comprising:
   changing the random index value periodically with a selected rate.

8. The method of claim 7, further comprising:
   on condition of changing the random index value to a new random index value, moving the cacheline to a new location that is based at least in part on the new random index value.

9. The method of claim 6, further comprising:
   on condition of removing the cacheline from the cache, changing the random index value.

10. The method of claim 1, further comprising:
    on condition of storing the cacheline as a speculative load for the memory instruction, marking the cacheline as speculative;
    on condition of resolving the speculative load for the memory instruction as non-speculative, marking the cacheline as non-speculative; and
    on condition of resolving the speculative load for the memory instruction as mis-speculated, removing the cacheline from the cache.

11. A system comprising:
    a cache storing a cacheline; and
    at least one processor configured to,
    store a random index value in a buffer;
    store the cacheline in the cache at a location that is based at least in part on the random index value;
    store in the buffer an access permission for the cacheline;
    for a memory instruction that involves the cacheline, determine whether the memory instruction is permitted to access the cacheline based at least in part on the access permission for the cacheline; and on condition of determining that the memory instruction is not permitted to access the cacheline, refrain from changing the cache.

12. The system of claim 11, wherein, the buffer includes a cache table that includes a cache table entry that identifies a region of the cacheline in a memory, and the at least one processor configured to store the access permission in the cache table entry for the cacheline.

13. The system of claim 11, wherein, the buffer includes a cache table including a cache table entry that identifies a region of the cacheline in a memory and region information for the cache table, and the at least one processor configured to store the access permission in the region information for the cache table.

14. The system of claim 11, wherein the at least one processor is further configured to, on condition of changing the access permission for the cacheline, invalidate the cacheline in the cache.

15. The system of claim 11, wherein the at least one processor is further configured to,
; and
on condition of determining that the memory instruction is permitted to access the cacheline, access the cacheline by determining the location of the cacheline based at least in part on the random index value.

16. The system of claim 15, wherein the at least one processor is further configured to change the random index value periodically with a selected rate.

17. The system of claim 16, wherein the at least one processor is further configured to, on condition of changing the random index value to a new random index value, move the cacheline to a new location that is based at least in part on the new random index value.

18. The system of claim 15, wherein the at least one processor is further configured to, on condition of removing the cacheline from the cache, change the random index value.

19. The system of claim 11, wherein the at least one processor is further configured to, on condition of storing the cacheline as a speculative load for the memory instruction, mark the cacheline as speculative;

on condition of resolving the speculative load for the memory instruction as non-speculative, mark the cacheline as non-speculative; and on condition of resolving the speculative load for the memory instruction as mis-speculated, remove the cacheline from the cache.

20. A non-transitory computer-readable storage medium comprising instructions that, when executed by a processor, cause the processor to perform operations including, storing a random index value in a buffer;

storing a cacheline in the cache at a location that is based at least in part on the random index value;

storing in a buffer an access permission for a cacheline stored in a cache;

for a memory instruction that involves the cacheline, determining whether the memory instruction is permitted to access the cacheline based at least in part on the access permission for the cacheline; and on condition of determining that the memory instruction is not permitted to access the cacheline, refraining from changing the cache.

* * * * *